(12) United States Patent
Magyar

(10) Patent No.: US 12,294,325 B2
(45) Date of Patent: May 6, 2025

(54) SYSTEMS AND METHODS FOR DYNAMICALLY CHANGING AN INVERTER SWITCHING FREQUENCY IN AN ELECTRIC MOTOR

(71) Applicant: Regal Beloit America, Inc., Beloit, WI (US)

(72) Inventor: Justin M. Magyar, Troy, OH (US)

(73) Assignee: Regal Beloit America, Inc., Milwaukee, WI (US)

( * ) Notice: Subject to any disclaimer, the term of this patent is extended or adjusted under 35 U.S.C. 154(b) by 153 days.

(21) Appl. No.: 18/331,003

(22) Filed: Jun. 7, 2023

(65) Prior Publication Data
US 2023/0396203 A1  Dec. 7, 2023

Related U.S. Application Data

(60) Provisional application No. 63/349,760, filed on Jun. 7, 2022.

(51) Int. Cl.
*H02P 1/26* (2006.01)
*H02M 7/48* (2007.01)
*H02P 27/06* (2006.01)

(52) U.S. Cl.
CPC .............. *H02P 27/06* (2013.01); *H02M 7/48* (2013.01)

(58) Field of Classification Search
CPC ........ H02P 27/06; H02P 27/085; H02M 7/48; H02M 1/327
See application file for complete search history.

(56) References Cited

U.S. PATENT DOCUMENTS

| 8,811,048 B2 | 8/2014 | Zhang | |
|---|---|---|---|
| 9,231,406 B2 | 1/2016 | Chen | |
| 2012/0235619 A1* | 9/2012 | Yun | F04B 49/06 318/452 |
| 2018/0278193 A1* | 9/2018 | Gurkaynak | H02S 40/32 |
| 2018/0375456 A1* | 12/2018 | Huh | E21B 43/128 |

* cited by examiner

*Primary Examiner* — Muhammad S Islam
(74) *Attorney, Agent, or Firm* — Armstrong Teasdale LLP

(57) ABSTRACT

An electric motor for a pump is provided. The electric motor includes a motor controller configured to convert alternating current (AC) power supplied to a variable frequency variable voltage power for driving the electric motor at a motor output according to a commanded motor output. The motor controller includes an inverter configured to generate the variable frequency variable voltage power according to the commanded motor output and a microcontroller coupled to the inverter. The microcontroller is configured to control the inverter to operate at a first switching frequency when the motor output is less than a threshold motor output and control the inverter to operate at a second switching frequency when the motor output is greater than the threshold motor output, wherein the second switching frequency is less than the first switching frequency.

20 Claims, 3 Drawing Sheets

SYSTEMS AND METHODS FOR DYNAMICALLY CHANGING AN INVERTER SWITCHING FREQUENCY IN AN ELECTRIC MOTOR

CROSS-REFERENCE TO RELATED APPLICATIONS

This application claims the benefit of priority to U.S. Provisional Patent Application Ser. No. 63/349,760, filed Jun. 7, 2022, and entitled "SYSTEMS AND METHODS FOR DYNAMICALLY CHANGING AN INVERTER SWITCHING FREQUENCY IN AN ELECTRIC MOTOR," the contents and disclosures of which are hereby incorporated in their entirety.

FIELD

The field of the disclosure relates generally to control of electric motors and, more specifically, dynamically changing an inverter switching frequency of an electric motor to balance audible sound and energy efficiency.

BACKGROUND

Electric motors utilize electric power to drive a mechanical load, such as, for example, a pool or spa pump, a fan or blower, or a propulsion system, among other applications. Such electric motors generally include a rotor coupled to the mechanical load and a stator including stator coils that produce an electromotive force (EMF) when an electric current is applied to the coils, causing the rotor to rotate. The stator coils are supplied current by an inverter that operates at a certain switching frequency, or frequency at which switches of the inverter are opened and closed, to produce an alternating current to supply to the stator coils.

When the inverter operates at relatively low frequencies that are audible to the human ear, an audible tone can be heard, which may be undesirable for some applications, such as pool or spa pumps in a home or commercial setting. Operating at lower frequencies, however, may reduce thermal energy losses at the inverter, improving energy efficiency of the electric motor.

BRIEF DESCRIPTION

In one aspect, an electric motor for a pump is provided. The electric motor includes a motor controller configured to convert alternating current (AC) power supplied to a variable frequency variable voltage power for driving the electric motor at a motor output according to a commanded motor output. The motor controller includes an inverter configured to generate the variable frequency variable voltage power according to the commanded motor output and a microcontroller coupled to the inverter. The microcontroller is configured to control the inverter to operate at a first switching frequency when the motor output is less than a threshold motor output and control the inverter to operate at a second switching frequency when the motor output is greater than the threshold motor output, wherein the second switching frequency is less than the first switching frequency.

In another aspect, a method of operating an electric motor for a pump is provided. The method includes controlling an inverter to operate at a first switching frequency when a motor output is less than a threshold motor output. The inverter is configured to generate a variable frequency variable voltage power for driving the electric motor at the motor output. The method further includes controlling the inverter to operate at a second switching frequency when the motor output is greater than the threshold motor output, wherein the second switching frequency is less than the first switching frequency.

In another aspect, a motor controller for an electric motor is provided. The motor controller is configured to convert AC power supplied to a variable frequency variable voltage power for driving the electric motor at a motor output according to a commanded motor output. The motor controller includes an inverter configured to generate the variable frequency variable voltage power according to the commanded motor output and a microcontroller coupled to the inverter. The microcontroller is configured to control the inverter to operate at a first switching frequency when the motor output is less than a threshold motor output and control the inverter to operate at a second switching frequency when the motor output is greater than the threshold motor output, wherein the second switching frequency is less than the first switching frequency.

DETAILED DESCRIPTION

Figure 1:
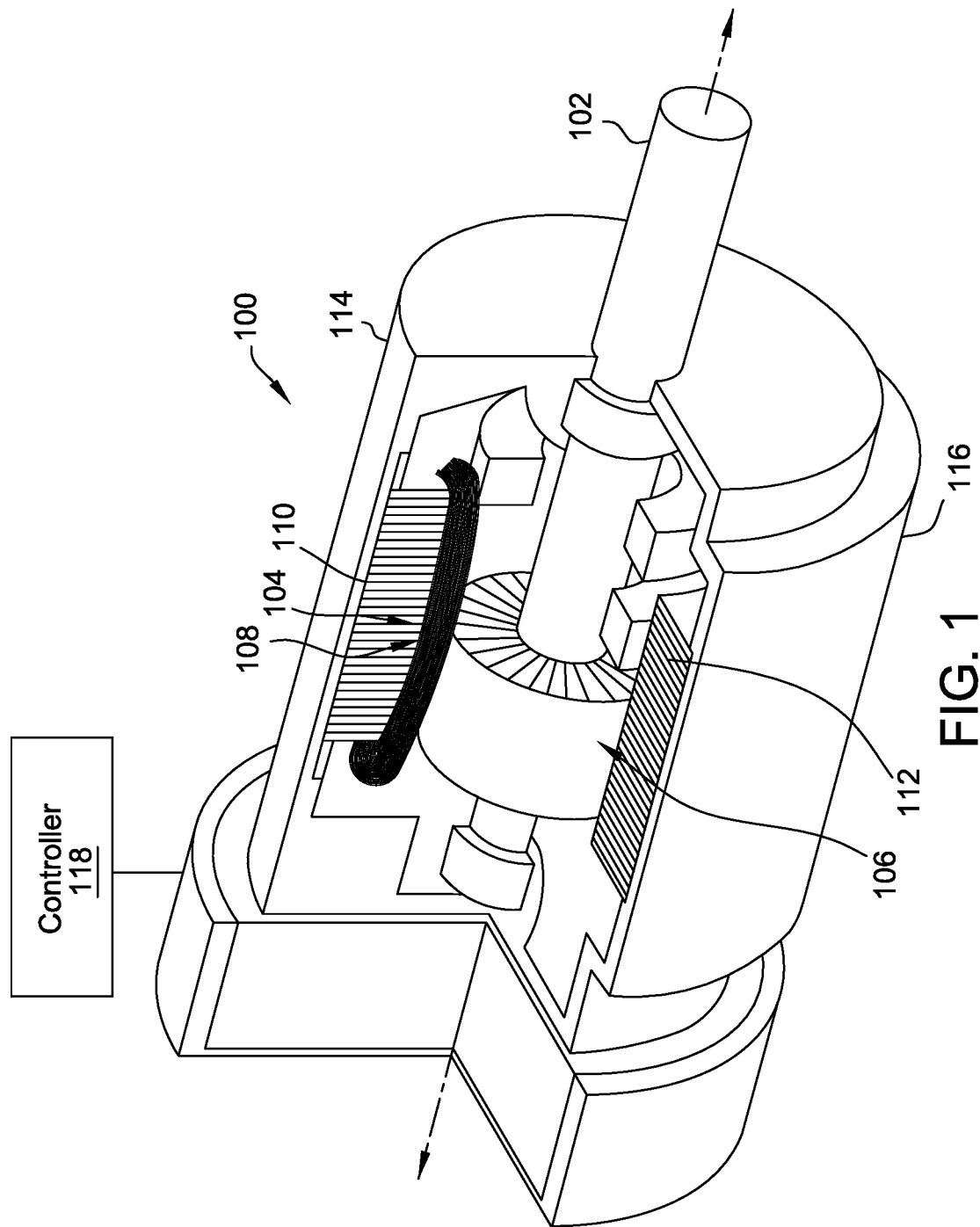
FIG. 1 is a partial cross-sectional view of an example electric machine, such as an electric motor.

The disclosed systems and methods include dynamically changing an inverter switching frequency of an electric motor to balance audible sound and energy efficiency in an electric motor, for example, for a pump. The electric motor includes a motor controller configured to convert supplied line frequency alternating current (AC) power to a variable frequency variable voltage power for driving the electric motor at a motor output (e.g., a speed and/or torque) according to a commanded motor output (e.g., a commanded speed or torque). The motor controller includes an inverter configured to generate the variable frequency variable voltage power according to the commanded motor output. The motor controller further includes a microcontroller coupled to the inverter, and the inverter is further configured to operate at a switching frequency, or a rate at which, for example, semiconductor switches of the inverter are opened and closed to generate the variable frequency variable voltage power from a direct current (DC) input.

The microcontroller is configured to control the inverter to operate at a first switching frequency when the motor output is less than a threshold motor output. When operating at a lower commanded motor output, less ambient sound is produced by the pump or other machinery coupled to the electric motor. A "loudness" of an acoustic (or "sound") signal is a subjective perception (e.g., to the human ear) of an amplitude of the sound signal, such that sound signals with a greater amplitude generally result in a sound perceived as louder, and sound signals with a lesser amplitude generally result in a sound perceived as less loud. In addition to amplitude, the loudness depends on a frequency of the sound signal. While a relationship between the loudness of the sound signal and its frequency is non-linear and may vary to an extent between individuals perceiving the sound signal, sounds at certain frequencies may be generally considered to be louder or less loud for substantially all humans. Accordingly, the first frequency may be a frequency for which sound signals are less loud or inaudible to the human ear at a given amplitude. For example, the first frequency may be twelve kilohertz or greater than twelve kilohertz, which is inaudible or of reduced perceptibility to humans compared to lower frequency signals of the same amplitude.

The microcontroller is further configured to control the inverter to operate at a second switching frequency when the commanded motor output is greater than the threshold motor output. The second frequency is less than the first frequency. Because when operating at a higher commanded motor output, more ambient sound is produced by the pump or other machinery coupled to the electric motor, sound produced by switching operations of the inverter may be inaudible over the ambient sound. Accordingly, the second frequency may be a frequency for which sound signals are, at the same amplitude, generally perceived as louder to the human ear such as, for example, 9 kilohertz. Further, by operating at a lower frequency, fewer actuations of the semiconductor switches of the inverter occur per second. Because each actuation results in energy losses such as thermal losses, by operating at the second, lower frequency when the ambient sound of the system is greater, a rate of thermal losses of the inverter may be reduced to improve the overall energy efficiency of the electric motor.

FIG. 1 is a partial cross-sectional view of an example electric machine 100. The electric machine 100 may be an electric motor or an electric generator. The electric motor may be used to power any mechanism, or load, for example, a pump, a cyclic drive, a compressor, a vehicle or other propulsion system, a fan, or a blower.

The electric machine 100 typically includes a centrally located motor shaft 102 that rotates relative to electric machine 100. Electrical energy, i.e., a voltage, is applied to coils 104 within electric machine 100. Coils 104 conduct an electric current to generate an electromagnetic field that cooperates with an electromagnetic field in rotor 106 mounted to the motor shaft 102. Coils 104 initiate relative motion between shaft 102 and electric machine 100 to transfer the power from coils 104 to shaft 102.

A stationary assembly 108, also referred to as a stator, includes stator core 110 and coils 104, or windings, positioned around portions of stator core 110. Energy is applied to coils 104 to initiate the relative motion that transfers the power to shaft 102. Coils 104 are formed by winding wire (not shown), typically copper, aluminum, or a combination thereof, about a central core to form the winding or coil. An electric current is directed through coils 104 that induces a magnetic field. The magnetic field induces the relative motion to transfer the power to shaft 102. The stator core 110 typically includes a solid core or a plurality of stator core laminations 112 that define stator teeth (not shown) around which coils 104 are wound.

Electric machine 100 generally includes a housing 114 having an inner wall or surface that defines a motor cavity therein. The housing 114 may include a plurality of components and may be made of a suitable durable material, for example a metal, a polymer, or a composite. The housing 114 may, as shown, include a cylindrical shell 116 and opposed end caps (not shown).

Housing 114 of the motor may have any suitable shape. One common shape of a motor housing is that of a cylindrical solid, having a generally cylindrical cross section. The shaft on a motor with such a shape generally extends from an end of the motor.

The electric machine 100 may have any suitable size and shape, and may be, for example, an induction motor, a permanent-split capacitor (PSC) motor, an electronically commutated motor (ECM) motor, or a switched reluctance motor. The electric machine 100 may, as shown, be a radial flux motor or may be an axial flux motor. The housing 114 may include protrusions, for example fins (not shown), for dissipation of heat. The electric machine 100 may also include a fan (not shown) positioned within housing 114. The electric machine 100 may be electronically controlled, particularly if the motor is an ECM motor, by, for example, a motor controller 118. The motor controller 118 may be internally or externally mounted to the electric machine 100. Alternatively, the motor controller 118 may be spaced from the electric machine 100 and may, for example, be a part of a system controller (not shown).

Figure 2:
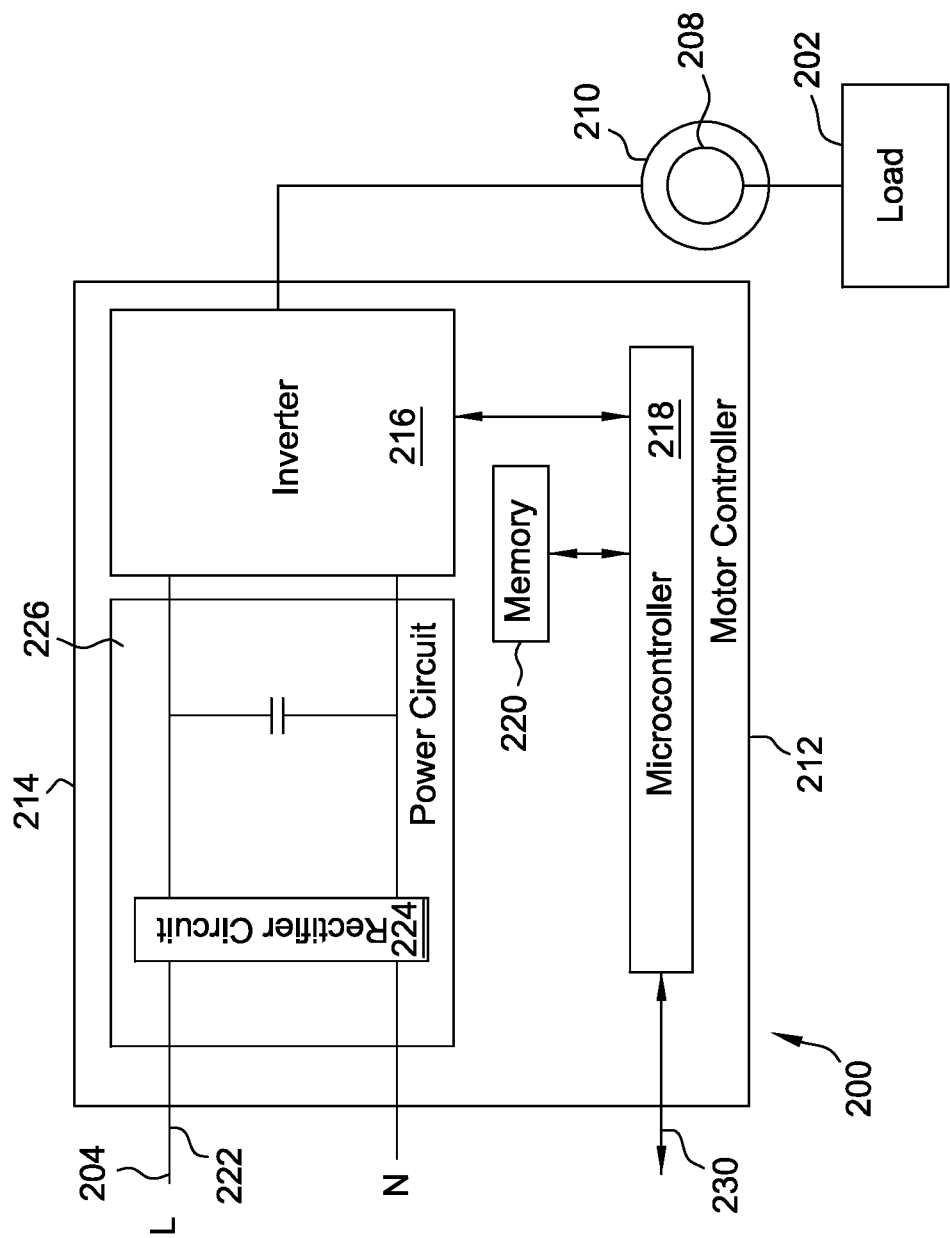
FIG. 2 is a diagram of an electric motor for driving a load, such as a pump.

FIG. 2 is a diagram of an electric motor 200 for driving a load 202, such as a pump commonly used, for example, in pools and spas. As such, electric motor 200 is typically connected to line frequency alternating current (AC) power, which is typically 50 Hertz or 60 Hertz and can be supplied at various line voltages, including, for example, 100 Volt, 110 Volt, 200 Volt, or 220 Volt, among others. Line frequency AC power is generally supplied as one or more phases on one or more corresponding circuits 204.

Electric motor 200 includes a rotor assembly 208 that rotates relative to a stator assembly 210, and is mechanically coupled to load 202, such as a pump. Electric motor 200 includes a motor controller 212 that regulates power to, or operates, rotor assembly 208 and stator assembly 210 to drive load 202. Motor controller 212 includes a power circuit 214, an inverter 216, or "drive," a microcontroller 218 or other processor, and memory 220.

Power circuit 214 receives line-frequency AC power at an AC line-in node 222 for powering the various components of electric motor 200. Power circuit 214 includes a rectifier circuit 224 that rectifies, or converts, line frequency AC power to a direct current (DC) voltage. The DC voltage is supplied to a DC bus 226 that delivers DC voltage to inverter 216 and other components, such as microcontroller 218 and memory 220.

Inverter 216 includes an array of semiconductor switches controlled to switch the DC voltage supplied by DC bus 226 in a manner to produce one or more phases of a variable frequency variable voltage current for supplying to windings of stator assembly 210. Inverter 216 is controlled by microcontroller 218. Inverter 216 is configured to operate at a variable switching frequency (i.e., the rate at which the input DC voltage is connected and disconnected to generate the variable frequency variable voltage output). As described in further detail below, the switching frequency may be varied based on load in response to instruction received from microcontroller 218. Each actuation of the semiconductor switches results energy losses, such as thermal energy losses. Accordingly, when inverter 216 is operated at a lower switching frequency, fewer actuations of the semiconductor switches occur per second, and a rate of such thermal losses may be reduced.

Microcontroller 218 is configured to communicate with memory 220 and inverter 216. Microcontroller 218 provides control signals to inverter 216, and inverter 216, in response, supplies current to windings of stator assembly 210 in the form of a variable frequency variable voltage signal. Accordingly, microcontroller 218 commands a motor output, i.e., a speed or torque output, at which electric motor 200 operates. In some embodiments, microcontroller 218 is configured to communicate with a user device, for example, through a wired or wireless communication channel, such as a serial interface or a Wi-Fi or Bluetooth connection. In such embodiments, users may view status data and control electric motor 200 via, for example, a mobile or web application. Similarly, microcontroller 218 may be configured to communicate with a system controller or other remote device through a wired or wireless communication channel. Such communication may include transmission of a system control signal from, e.g., the system controller, to microcontroller 218, including a commanded motor output (Q), such as a commanded speed or a commanded torque. Alternatively, the system control signal may include an operating mode, e.g., high or low, from which microcontroller 218 can determine an appropriate commanded motor output (Q), which may be stored in memory 220 as a discreet value, as a table of values, or as algorithm or formula, each of which representing an operating profile for electric motor 200.

Microcontroller 218 executes a control loop to determine a set point for motor output, i.e., speed or torque output, for electric motor 200. The control loop generally operates in a closed loop based on a commanded motor output (Q) and a measured parameter feedback, the feedback typically including either measured speed (N) output or measured torque (T) output from electric motor 200. Microcontroller 218 executes the control loop iteratively to converge motor output toward the set point for motor output, e.g., using a proportional-integral (PI) or proportional-integral-derivative (PID) control logic. Microcontroller 218 may additionally use an operating profile to translate the commanded motor output (Q) to the set point. The operating profile may include a table of values, i.e., a lookup table, discreet values, or an algorithm or formula stored in memory 220. In certain embodiments, for example, those using an algorithm or formula, the operating profile may use one or more coefficients or constants (A) determined at manufacture, at calibration, or at installation, and written to memory 220.

Microcontroller 218 is configured to control inverter 216 to operate at a first switching frequency when the motor output is less than a threshold motor output (e.g., a threshold speed or a threshold torque). The first switching frequency may be relatively high (e.g., greater than about 12 kilohertz), such that human perception of the sound signals produced by inverter 216 when operating at the first switching frequency is reduced compared that of inverter 216 when operating at lower frequencies (e.g. less than about 12 kilohertz). For example, humans generally perceive sound signals greater than 12 kilohertz, for example, 16 kilohertz, as being less loud than sound signals of the same amplitude less than 12 kilohertz, for example, 9 kilohertz. Sound signals exceeding a certain threshold frequency may be imperceptible to the human ear. For example, while the upper frequency threshold for hearing may very per individual, humans generally are not capable of perceiving sound signals of greater than 20 kilohertz. Accordingly, operating inverter 216 at a relatively high switching frequency may reduce the perceived sound resulting from operation of electric motor 200.

Microcontroller 218 is further configured to control inverter 216 to operate at a second switching frequency when the motor output is greater than a threshold motor output. The second frequency is less than the first frequency (e.g., less than 12 kilohertz, or about 9 kilohertz), and as a result when inverter 216 operates at the second frequency, inverter 216 may produce a louder audible sound than when inverter 216 operates at the first frequency. Because at higher load conditions (e.g., higher speeds) related machinery (e.g., a pump coupled to electric motor 200) generally produces more ambient sound, the sound produced by inverter 216 when operating at the lower frequency may be inaudible over the ambient sound of the related machinery. Accordingly, the disadvantages associated with higher sound levels when operating inverter 216 at a lower frequency are reduced when load requirements are higher. Additionally, as described above, by operating inverter 216 at a lower frequency, thermal losses of inverter 216 resulting from semiconductor switching may also be reduced, so operating inverter 216 at least some of the time (e.g., under higher load conditions) may improve an energy efficiency of electric motor 200. In some embodiments, microcontroller 218 is configured to control inverter 216 at a continuously variable switching frequency computed based on the current motor output.

Figure 3:
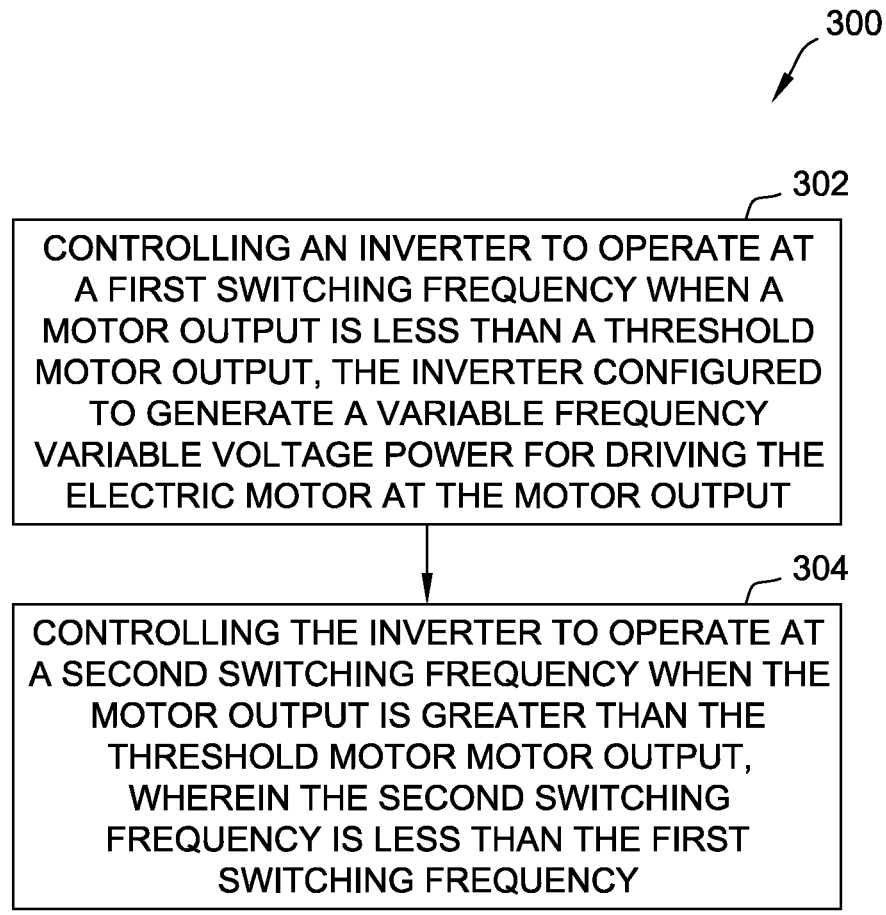
FIG. 3 is a flow diagram of an example method of controlling an electric motor.

FIG. 3 is a flow diagram of an example method 300 of controlling electric motor 200. Method 300 may be embodied in a motor controller, such as motor controller 212 including inverter 216, and microcontroller 218 (all shown in FIG. 2).

Microcontroller 218 controls 302 inverter 216 to operate at a first switching frequency when a motor output is less than a threshold motor output. Inverter 216 is configured to generate a variable frequency variable voltage power for driving electric motor 200 according to the commanded motor output (Q). Microcontroller 218 controls 304 inverter 216 to operate at a second switching frequency when the motor output is greater than the threshold motor output, wherein the second frequency is less than the first frequency.

The methods and systems described herein may be implemented using computer programming or engineering techniques including computer software, firmware, hardware or any combination or subset thereof, wherein the technical effect may include at least one of: (a) improving an energy efficiency of an electric motor for a pump by operating an inverter of the electric motor at a lower switching frequency to reduce thermal losses under high load conditions when sound generated by the inverter is less than ambient sound produced by the pump; and (b) reducing audible sound of an electric motor by operating an inverter of the electric motor at a higher switching frequency that produces less audible sound.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, compact disc-read only memory (CD-ROM), digital versatile discs (DVDs), and any other digital source such as a network or the Internet, as well as yet to be developed digital means, with the sole exception being a transitory, propagating signal. Alternatively, a floppy disk, a CD-ROM, a magneto-optical disk (MOD), a DVD, or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the example embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor for a pump, said electric motor comprising:
   a motor controller configured to convert alternating current (AC) power supplied to a variable frequency variable voltage power for driving said electric motor at a motor output according to a commanded motor output, said motor controller comprising:
      an inverter configured to generate the variable frequency variable voltage power according to the commanded motor output; and
      a microcontroller coupled to said inverter and configured to:
         control said inverter to operate at a first switching frequency when the motor output is less than a threshold motor output; and
         control said inverter to operate at a second switching frequency when the motor output is greater than the threshold motor output, wherein the second switching frequency is less than the first switching frequency.

2. The electric motor of claim 1, wherein said inverter is perceptibly louder to a human when operating at the second switching frequency than when operating at the first switching frequency.

3. The electric motor of claim 1, wherein when operating at the second switching frequency, a sound produced by said inverter is less loud than an ambient sound produced by the pump when the commanded motor output is greater than the threshold motor output.

4. The electric motor of claim 1, wherein the first switching frequency is 12 kilohertz or greater than 12 kilohertz.

5. The electric motor of claim 1, wherein the second switching frequency is 9 kilohertz or less than 9 kilohertz.

6. The electric motor of claim 1, wherein the motor output includes a speed, and wherein the threshold motor output is a threshold speed.

7. The electric motor of claim 1, wherein the motor output includes a torque, and wherein the threshold motor output is a threshold torque.

8. The electric motor of claim 1, wherein the microcontroller is further configured to control said inverter to operate at a continuously variable switching frequency computed based on the motor output.

9. A method of operating an electric motor for a pump, said method comprising:
controlling an inverter to operate at a first switching frequency when a motor output is less than a threshold motor output, the inverter configured to generate a variable frequency variable voltage power for driving the electric motor at the motor output; and
controlling the inverter to operate at a second switching frequency when the motor output is greater than the threshold motor output, wherein the second switching frequency is less than the first switching frequency.

10. The method of claim 9, wherein the inverter is perceptibly louder to a human when operating at the second switching frequency than when operating at the first switching frequency.

11. The method of claim 9, wherein when operating at the second switching frequency, a sound produced by the inverter is less loud than an ambient sound produced by the pump when the motor output is greater than the threshold motor output.

12. The method of claim 9, wherein the first switching frequency is 12 kilohertz or greater than 12 kilohertz.

13. The method of claim 9, wherein the second switching frequency is 9 kilohertz or less than 9 kilohertz.

14. The method of claim 9, wherein the motor output includes a speed, and wherein the threshold motor output is a threshold speed.

15. The method of claim 9, wherein the motor output includes a torque, and wherein the threshold motor output is a threshold torque.

16. The method of claim 9, further comprising controlling the inverter to operate at a continuously variable switching frequency computed based on the motor output.

17. A motor controller for an electric motor, said motor controller configured to convert alternating current (AC) power supplied to a variable frequency variable voltage power for driving the electric motor at a motor output according to a commanded motor output, said motor controller comprising:
an inverter configured to generate the variable frequency variable voltage power according to the commanded motor output; and
a microcontroller coupled to said inverter and configured to:
control said inverter to operate at a first switching frequency when the motor output is less than a threshold motor output; and
control said inverter to operate at a second switching frequency when the motor output is greater than the threshold motor output, wherein the second switching frequency is less than the first switching frequency.

18. The motor controller of claim 17, wherein said inverter is perceptibly louder to a human when operating at the second switching frequency than when operating at the first switching frequency.

19. The motor controller of claim 17, wherein the electric motor is configured to drive a pump, and wherein when operating at the second switching frequency, a sound produced by said inverter is less loud than an ambient sound produced by the pump when the commanded motor output is greater than the threshold motor output.

20. The motor controller of claim 17, wherein the microcontroller is further configured to control said inverter to operate at a continuously variable switching frequency computed based on the motor output.

* * * * *